United States Patent
Hewlett, II et al.

(10) Patent No.: US 11,455,551 B2
(45) Date of Patent: *Sep. 27, 2022

(54) DATA BLAMING

(71) Applicant: Palo Alto Networks, Inc., Santa Clara, CA (US)

(72) Inventors: William Redington Hewlett, II, Mountain View, CA (US); Seokkyung Chung, San Jose, CA (US); Lin Xu, Saratoga, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 301 days.

This patent is subject to a terminal disclaimer.

(21) Appl. No.: 16/357,064

(22) Filed: Mar. 18, 2019

(65) Prior Publication Data

US 2019/0213489 A1    Jul. 11, 2019

Related U.S. Application Data

(63) Continuation of application No. 14/810,335, filed on Jul. 27, 2015, now Pat. No. 10,296,836.

(60) Provisional application No. 62/141,202, filed on Mar. 31, 2015.

(51) Int. Cl.
*G06N 5/04* (2006.01)
*G06N 20/00* (2019.01)
*G06N 20/20* (2019.01)
*G06N 20/10* (2019.01)
*G06N 5/00* (2006.01)

(52) U.S. Cl.
CPC ............... *G06N 5/04* (2013.01); *G06N 20/00* (2019.01); *G06N 20/20* (2019.01); *G06N 5/003* (2013.01); *G06N 20/10* (2019.01)

(58) Field of Classification Search
CPC .......... G06N 5/003; G06N 5/04; G06N 5/046; G06N 5/047; G06N 20/00; G06N 20/10; G06N 20/20
See application file for complete search history.

(56) References Cited

U.S. PATENT DOCUMENTS

| | | | |
|---|---|---|---|
| 2014/0223562 A1* | 8/2014 | Liu | G06N 3/084 726/23 |
| 2014/0229164 A1* | 8/2014 | Martens | G06F 40/40 704/9 |
| 2015/0188941 A1 | 7/2015 | Boshmaf | |

OTHER PUBLICATIONS

Jong Myong Choi. A Selective Sampling Method for Imbalanced Data Learning on Support Vector Machines. 2010. Iowa State University. (Year: 2010).*
Alexander Vezhnevets and Olga Barinova. Avoiding Boosting Overfitting by Removing Confusing Samples. ECML. 2007 (Year: 2007).*
Leo Breiman, "Random Forests", Machine Learning, Kluwer Academic Publishers, 2001.

(Continued)

*Primary Examiner* — Shane D Woolwine
(74) *Attorney, Agent, or Firm* — Van Pelt, Yi & James LLP

(57) ABSTRACT

An identification of an item that was misclassified by a classification model constructed in accordance with a machine learning technique is received. One example of such a machine learning technique is a random forest. A subset of training data, previously used to construct the model, and that is associated with the misclassified item is identified. At least a portion of the identified subset is provided as output.

21 Claims, 5 Drawing Sheets

(56) References Cited

OTHER PUBLICATIONS

Lin et al.,"Random Forests and Adaptive Nearest Neighbors." Journal of the American Statistical Association, vol. 101, No. 474, pp. 578-590, 2006.
Szczepański et al., "An Automated Framework with Application to Study Url Based Online Advertisements Detection", Journal of Applied Mathematics, Statistics and Informatics, 9(1), 47-60. doi: https://doi.org/10.2478/iamsi-2013-0005, 2013.
Sun et al., Identifying and Correcting Mislabeled Training Instances, Future Generation Communication and Networking (FGCN 2007), Dec. 2007, pp. 244-250, vol. 1, IEEE.

\* cited by examiner

DATA BLAMING

CROSS REFERENCE TO OTHER APPLICATIONS

This application is a continuation of co-pending U.S. patent application Ser. No. 14/810,335 entitled DATA BLAMING filed Jul. 27, 2015, which is incorporated herein by reference for all purposes, which claims priority to U.S. Provisional Patent Application No. 62/141,202 entitled RANDOM FOREST DATA BLAMING filed Mar. 31, 2015 which is also incorporated herein by reference for all purposes.

BACKGROUND OF THE INVENTION

Machine learning classifiers are used in conjunction with a variety of technologies. In one aspect of machine learning, a model is constructed using a set of training data (also referred to as example data). Once constructed, the model can be used to classify other data (e.g., data not included in the set of training data). Unfortunately, models are imperfect, and data will sometimes be incorrectly classified using such models. Determining why a model has yielded an incorrect classification can be very difficult. Accordingly, improvements in techniques for building, evaluating, and refining models would be desirable.

BRIEF DESCRIPTION OF THE DRAWINGS

Various embodiments of the invention are disclosed in the following detailed description and the accompanying drawings.

DETAILED DESCRIPTION

Figure 1:
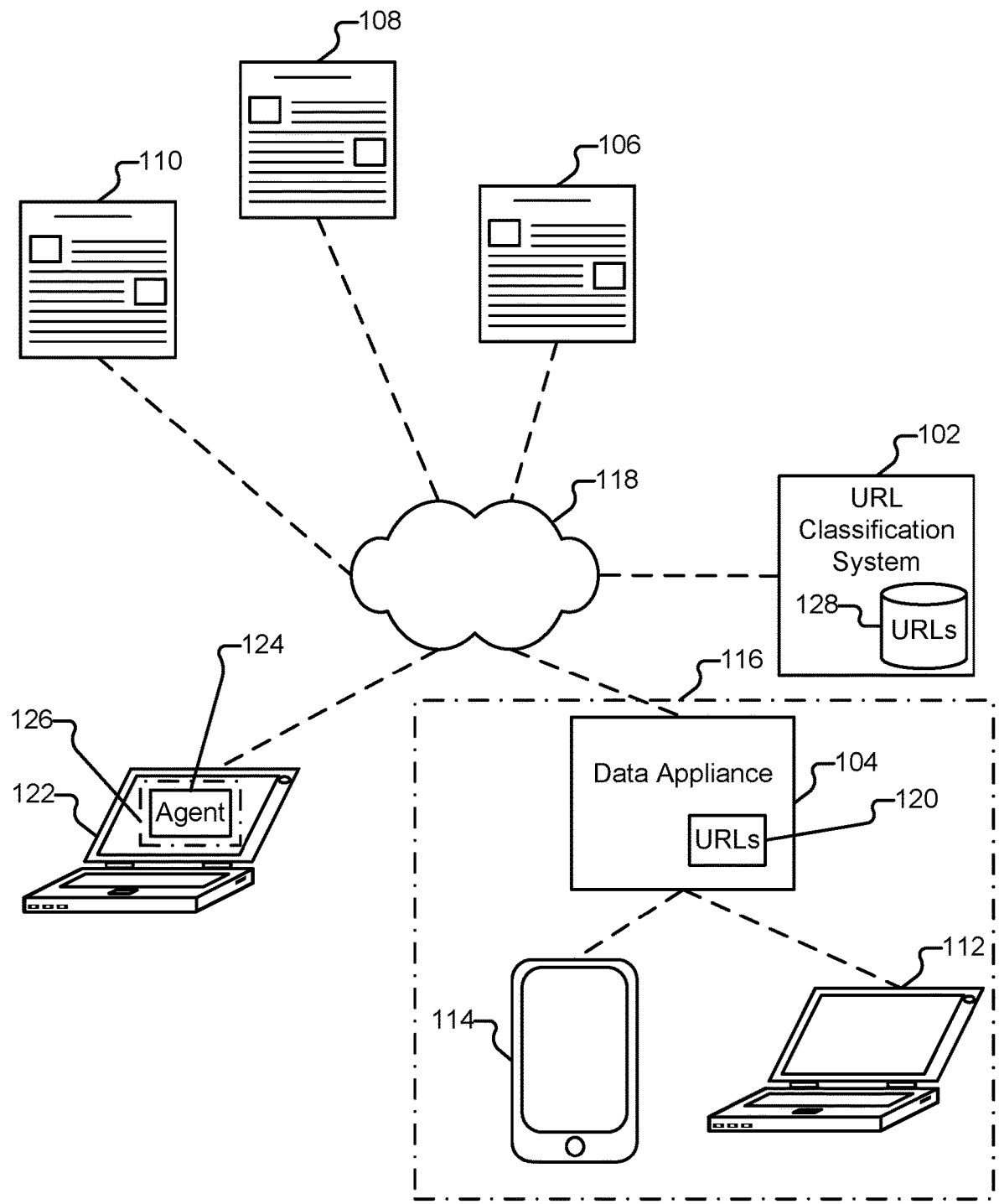
FIG. 1 illustrates an example of an environment in which data classification is performed.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Machine learning classifiers can be used for a variety of purposes, such as classifying website content reachable via Universal Resource Locators (URLs) into categories (e.g., "gambling" or "pornography"). One example of a machine learning classifier is a random forest. Unfortunately, sometimes machine learning classification results are incorrect. For example, a particular URL with content pertaining to a legitimate shopping website might be erroneously categorized as spam. One reason for this is that items in the training set used to build the classification model may themselves be misclassified. Another reason is that items in the training set may have features that make them problematic for use in training (e.g., containing an insufficient amount of text). Determining why a model's classification did not work well for a particular URL can be very difficult. For example, in contrast with debugging software, which might crash or otherwise provide indicators that something is wrong, data can be noisy (particularly with very large sets of training data) and often includes probabilistic elements. Further, a significant amount of computing resources is often needed to construct a model, and identifying the contributions of individual training items to the model (e.g., through testing) can be analogized to searching for a needle in a haystack.

Using techniques described herein, "blame" can be assigned to items in the training set (used to train the model), so that when a new item (i.e., one outside the set) is classified incorrectly using the model, information about why the item was classified incorrectly can be obtained. In particular, techniques described herein can be used to determine which items of the training set were most likely to be the part of the decision to classify a given item in a particular way (e.g., by determining the most probable explanation for why the unexpected result was reached by the classifier).

In the following discussion, reference is made to the classification, by system 102, of content reachable via a Universal Resource Locator (URL), such as website content. The techniques disclosed herein can be used with the classification of other kinds of data as well, and need not be limited to URLs/website content. For example, messages in an email archive, and/or documents in a repository can be classified, with misclassified results attributable to respective training set items in accordance with embodiments of techniques described herein. Further, the techniques described herein are not limited to textual data and can be used in conjunction with improving classifiers of other kinds of data (e.g., image classifiers).

FIG. 1 illustrates an example of an environment in which data classification is performed. In the environment shown in FIG. 1, a URL classification system 102 classifies content reachable via URLs, and stores the results of its classification in a URL database 128 (or another appropriate storage, as applicable). URL classification system 102 makes its classifications available to other systems, such as data appliance 104, and to client device 122 (via agent 124). System 102 can perform classifications in batch processes (e.g., re-checking the classifications of existing URLs periodically) and can also perform classifications on demand (e.g., when a request for classification of a specific URL is received, such as from appliance 104). As will be described in more detail below, copies of database 128 (and/or portions thereof, whether in database form or in another form, such as a text file) can be provided by system 102 to other systems.

The functionality provided by URL classification system 102 can be provided in a variety of ways. For example, classification system 102 can be a dedicated device or set of devices. The functionality provided by classification system 102 can also be integrated into or executed as software on a general purpose computer, a computer server, a gateway, and/or a network/routing device. Further, whenever classification system 102 is described as performing a task, a single component, a subset of components, or all components of classification system 102 may cooperate to perform the task. Similarly, whenever a component of classification system 102 is described as performing a task, a subcomponent may perform the task and/or the component may perform the task in conjunction with other components. In various embodiments, portions of classification system 102 are provided by one or more third parties. Depending on factors such as the amount of computing resources available to classification system 102, various logical components and/or features of classification system 102 may be omitted and the techniques described herein adapted accordingly. Similarly, additional logical components/features can be added to classification system 102 as applicable.

Site 106 is a pornographic website and its URLs are classified by system 102 (e.g., as "Adult—Pornographic") accordingly. Site 108 is a video streaming website and its URLs are also classified by system 102 (e.g., as "Entertainment—Video Streaming") accordingly. Finally, site 110 is a social networking website and its URLs are classified by system 102 (e.g., as "Social Networking") accordingly, as well. System 102 classifies URLs (such as URLs 106-110) using a model trained using a training set (e.g., containing 1,000,000 pre-classified training samples). System 102 can obtain the training samples in a variety of ways, including by collecting/curating the samples, and by purchasing or otherwise obtaining at least some of the samples from a third-party vendor.

One way to create a model is to build a random forest using a MapReduce architecture (e.g., a set of commodity servers running Apache Hadoop). Newly seen items (e.g., those outside the training set) are classified using the trained model. As will be described in more detail below, when problems in the classification are encountered, anomalies can be provided to a specialized version of the random forest—referred to herein as a "blame forest," for investigation.

The classifications made by system 102 can be used in a variety of ways. As a first example, suppose client device 122 is a family computer. The owners of client device 122 (e.g., the parents in a family) have installed a software application 126 that restricts the ability of users of the family computer to visit certain types of websites. Examples of embodiments of software 126 include a browser plugin, a software firewall, and a standalone browser. The restrictions can be universally applied to all users of client device 122, and can also be customized (e.g., based on the age/identity of the user). For example, all users of client device 122 can be prevented by software 126 from accessing websites classified as being "scams" or otherwise posing security risks. As another example, while parent-users of client device 122 might elect to view adult-themed websites (and thus not configure the software to prevent their access to such sites), a configuration preventing access to adult-oriented websites by child-users of device 122 could be made with respect to software 126. Software 126 (or embodiments thereof) can also be run on other devices, such as tablets, smartphones, and gaming consoles, as applicable. And, embodiments of device 122 can be owned/operated by a variety of other entities, such as schools, libraries, companies, etc.

In various embodiments, software 126 is configured to retrieve a listing of the top million URLs (i.e., those URLs most-visited by the general public) and their associated categorizations from URL classification system 102 via agent 124. The listing can be refreshed periodically, and provided to device 122 accordingly (e.g., as part of a subscription service offered by the maintainer of software 126, by system 102, or another appropriate entity). In some cases, a user of client device 122 may attempt to visit a site for which an existing classification has not been received from system 102. In that situation, software 126 (e.g., via agent 124) can submit the URL to system 102 for classification and, for example, block access to the URL until a result is received back from system 102.

In some cases, the classification of a URL provided by system 102 (e.g., via software 126) may be incorrect. As one example, suppose a child-user of device 122 attempts to visit www.purpledogexample.com. The site is a child-friendly destination, offering age appropriate puzzles and games, but has been erroneously classified by system 102 as relating to alcoholic beverages. When the child attempts to visit the site, software 126 displays an alert indicating that access to the site is blocked, and provides a reason ("the site has been categorized as Adult-Alcohol themed"). Also included in the alert is an option to report the classification as incorrect (e.g., by clicking a "report this classification as incorrect" link in the interface). When the reporting option is selected, a message is transmitted (e.g., to an administrator of system 102 and/or to a maintainer of software 126 as applicable) and actions can be taken to remedy the misclassification in accordance with techniques described herein.

A second example of how system 102's URL classifications can be used is as follows. Suppose laptop 112 and tablet 114 are client devices present within a corporate network environment 116. Data appliance 104 is configured to enforce policies regarding communications between clients such as clients 112 and 114, and nodes outside of enterprise network 116 (e.g., reachable via a set of one or more external networks depicted collectively in FIG. 1 as network cloud 118). One example of a policy is a rule prohibiting any access to pornographic websites (e.g., site 106) by any client inside enterprise network 116. Another example of a policy is a rule prohibiting access to social networking sites (e.g., site 110) by clients between the hours of 09:00 and 18:00. Yet another example of a policy is a rule allowing access to streaming video websites (e.g., site 108), subject to a bandwidth or other consumption constraint. Yet another example of a policy is one that logs the time spent by employees using social networking sites (e.g., where there is an understanding that employees will sometimes visit such sites throughout the workday, but should keep such activities to fifteen minutes or less per day). Policies can be made to apply to all devices equally, and can also be applied at more granular levels. For example, access to social networking site 110 can be permitted to anyone in the marketing department (e.g., users having associated group identifiers indicating their affiliation with the marketing department), and unfettered bandwidth for use with streaming video website 108 can be granted to specific users (e.g., the CEO) or groups of users (e.g., the sales department). Other examples of policies include security policies such as ones requiring the scanning for threats in incoming (and/or outgoing) email attachments, website downloads, files exchanged through instant messaging programs, and/or other file transfers. Yet other types of policies can also be enforced by data appliance 104, such as ones governing traffic shaping, quality of service, or routing with respect to a given URL, pattern of URLs, category of URL, or other URL information. In some embodiments, data appliance 104 is also configured to enforce policies with respect to traffic that stays within enterprise network 116.

As with embodiments of software 126, data appliance 104 is configured to receive a listing of URLs 120 and their corresponding classifications from URL classification system 102 (e.g., "www.facebook.com":social networking). The listing received by data appliance 104 may be identical to that received by software 126, and can also be different (e.g., the top 10 million URLs instead of the top million URLs; and/or in a different format—with software 126 receiving the information as a flat file and data appliance 104 instead receiving a database). Requests for content (e.g., made by client 114 or client 112 and processed through data appliance 104) are checked against the URL classifications 120 stored by appliance 104, and any applicable policies applied. As with embodiments of software 126, in the event data appliance 104 does not have a classification for a given URL, data appliance 104 can submit a request for classification to system 102 (and, e.g., block the request until a response is received).

In various embodiments, when a user of client device 114 or 112 is prevented from accessing a resource (e.g., site 108) due to the resource's classification (e.g., video streaming) being implicated in a policy, the user is presented with a notification explaining why access has been prevented. As with software 126, the user can be provided a dialogue to indicate if the classification is erroneous. The user's report can be sent to an administrator of appliance 104 and/or can be sent to an administrator of system 102 (or another appropriate destination) for further investigation. In various embodiments, system 102 makes available a web form interface (or other appropriate reporting mechanism, such as an Application Programming Interface) for reporting misclassified URLs instead of/in addition to accepting reports via interfaces incorporated into software 126 or provided by data appliance 104, as applicable.

Figure 2:
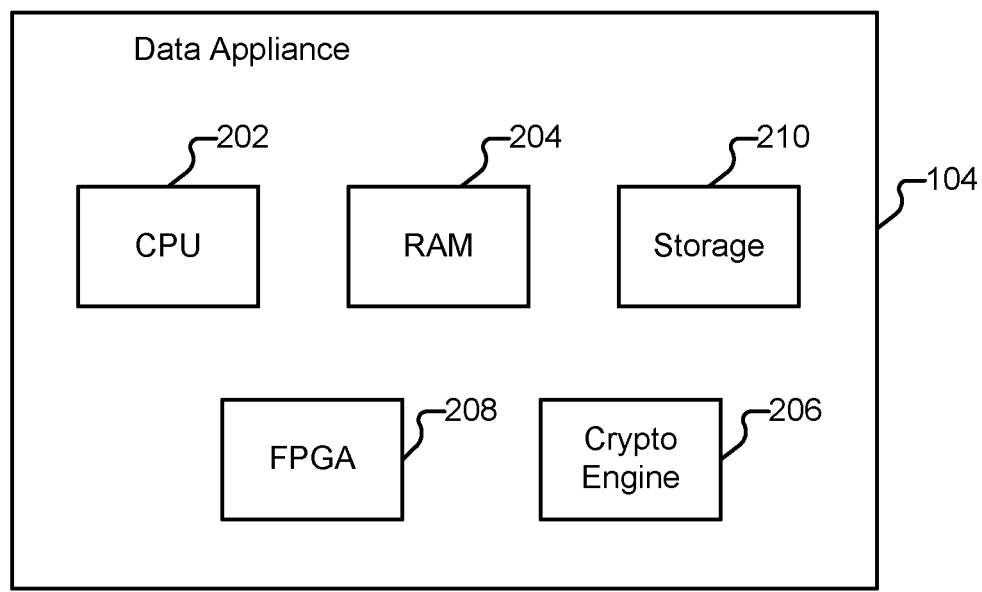
FIG. 2 illustrates an embodiment of a data appliance.

FIG. 2 illustrates an embodiment of a data appliance. The example shown is a representation of physical components that are included in data appliance 104, in various embodiments. Specifically, appliance 104 includes a high performance multi-core CPU 202 and RAM 204. Appliance 104 also includes a storage 210 (such as one or more hard disks), which is used to store policy and other configuration information, as well as URL information (120). Appliance 104 can also include one or more optional hardware accelerators. For example, appliance 104 can include a cryptographic engine 206 configured to perform encryption and decryption operations, and one or more FPGAs 208 configured to perform matching, act as network processors, and/or perform other tasks.

The functionality provided by data appliance 104 can be provided in a variety of ways. For example, data appliance 104 can be a dedicated device or set of devices. The functionality provided by data appliance 104 can also be integrated into or executed as software on a general purpose computer, a computer server, a gateway, and/or a network/routing device. Further, whenever appliance 104 is described as performing a task, a single component, a subset of components, or all components of data appliance 104 may cooperate to perform the task. Similarly, whenever a component of appliance 104 is described as performing a task, a subcomponent may perform the task and/or the component may perform the task in conjunction with other components. In various embodiments, portions of appliance 104 are provided by one or more third parties. Depending on factors such as the amount of computing resources available to appliance 104, various logical components and/or features of appliance 104 may be omitted and the techniques described herein adapted accordingly. Similarly, additional logical components/features can be added to appliance 104 as applicable.

Random Forest Overview

Figure 3:
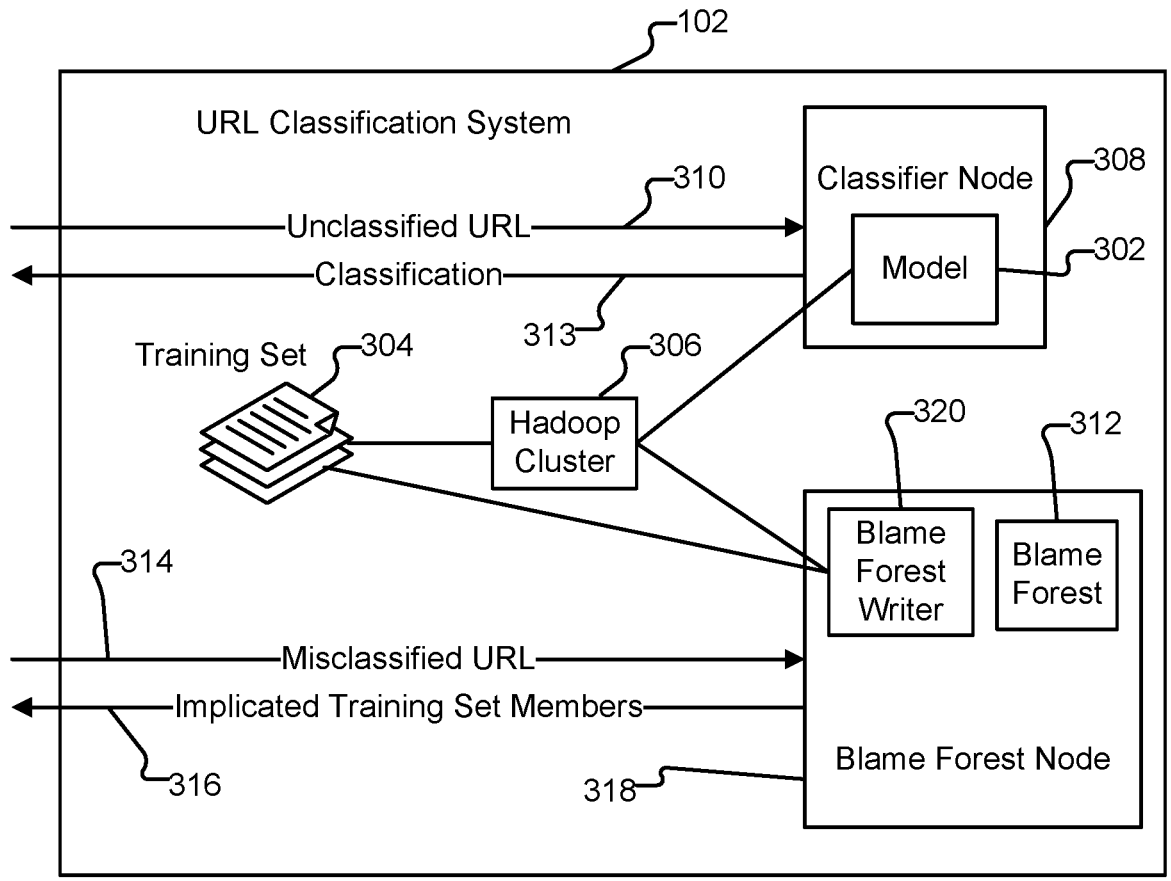
FIG. 3 illustrates an example of components that can be incorporated into a classification system.

FIG. 3 illustrates an example of components that can be incorporated into a classification system, such as URL classification system 102. As explained above, in various embodiments, classification system 102 makes use of a model trained using a random forest. As one example, model 302 can be constructed using a training set 304 and commodity computing resources such as a Hadoop Cluster 306 (e.g., a production cluster of 35 physical nodes, each of which has 10 mappers and/or reducers, and 200G of RAM).

The random forest comprises a number of decision trees (e.g., 500 or 1,000 decision trees) generated using various subsections of training set 304 to select features to split on. In each decision tree, at each internal node, a feature is queried. For example, if the decision tree is a binary tree, a yes/no question is asked upon the feature at each internal node. If the answer is yes, then the left branch is followed. If the answer is no, the right branch is followed, for example. Eventually, a leaf is reached, which is also referred to herein as the result. As will be described in more detail below, each leaf is associated with a category, with a given category having many leaves in the same tree associated with it.

In the random forest used by embodiments of system 102, each tree includes approximately 50,000 nodes, of which approximately half (25,000) are leaf nodes and the rest internal. The random forest is used to ultimately classify an item (e.g., a URL) into one of approximately 60 categories (e.g., "shopping," "health," "sports," "pornography," etc.). Each leaf in each tree is associated with one of the categories (with a given category having many associated leaves in each tree—e.g., 1,000 leaves within a particular decision tree may be labeled "shopping," with another 1,000 leaves within the tree labeled "sports."). A set of approximately one million training samples is used (304), with an average item in the training set (e.g., a given training sample) having five features, with high variance. There exist approximately 2,000 features collectively present across all of the samples. The numbers provided here are examples—and are examples of sizes usable in a URL classification system (102) such as is shown in the environment of FIG. 1. Forests of other sizes, having trees of other sizes, categories of other sizes, features of other sizes, etc. can also be used in accordance with techniques described herein.

Once the model is constructed (e.g., by Hadoop Cluster 306), it is provided to one or more classifier nodes (e.g., classifier node 308), which store and use the model to classify new items (i.e., items not in the training set). As one example, classifier node 308 uses its copy of model 302 to classify a newly discovered (and unclassified) URL 310 (e.g., received from agent 124 or data appliance 104 for classification). Classifier node 308 can be operated by the same entity that operates Hadoop Cluster 306, and can also be operated by a separate entity as applicable. Further, the classification services can be operated as standalone services (e.g., as shown in FIG. 1) and can also be incorporated into other infrastructure, such as a firewall or other security appliance (e.g., appliance 104).

Classifier node 308 is illustrated as a single logical device in FIG. 3, and can comprise standard commercially available server hardware (e.g., having a multi-core processor, 16+ Gigabytes of RAM, a set of one or more Gigabit network interface adaptors, and a set of one or more storage devices) running a typical server-class operating system (e.g., Linux). In various embodiments, classifier node 308 is a scalable, elastic architecture comprising distributed components, including components provided by one or more third parties (e.g., provided by Amazon Web Services). Accordingly, a single classifier node, or multiple classifier nodes (e.g., working in cooperation), may be employed to perform classification services. Further, when classifier node 308 is referred to as performing a task, such as storing data or processing data, it is to be understood that a sub-component or multiple sub-components of classifier node 308 (whether individually or in cooperation with third party components) may cooperate to perform that task.

During classification of a new item (e.g., URL 310), conceptually, each tree in model 302's forest votes on how the new item should be classified, using each of their respective leaves (results) to which the new item ultimately traversed, and the categories associated with those leaves. For example, of the 500 decision trees used to construct model 302, a given URL may wind up at leaves labeled "pornography" in 300 decision trees, may wind up at leaves labeled "gambling" in 100 decision trees, etc. Whichever classification is most commonly selected across the forest can be used to label the new item. In various embodiments, confidence values are also associated with leaf nodes—instead of voting uniformly, each tree votes with a fraction, up to 1, of a confidence in its verdict.

When problems in the classification are encountered (e.g., URL 310 is erroneously classified (313) as shopping instead of travel using model 302), anomalies can be provided to a special forest—referred to herein as a "blame forest" (312), for investigation. The blame forest can be used to assemble a list of training examples (316) that led to the erroneous classification of URL 310. As one example, the operator of the misclassified website (reached via URL 310) might lodge a complaint with URL classification system 102 (e.g., by filling out a support request form made available by the classification system) that the website has been misclassified, and as a consequence, visitors are prevented from visiting the website by content-blocking software that relies on system 102's classifications (e.g., software 126). The operator of URL classification system 102 can investigate which items in the training set led to the URL (e.g., URL 314) being misclassified, helping the URL classification service improve/refine the training sample (and helping prevent future misclassifications).

Blame Forest Construction

A blame forest (312) can be constructed (e.g., at a blame forest node 318) to provide links back to the examples in the training set (304) that led to an item (e.g., 310) being classified (e.g., by classifier node 308) a certain way. In various embodiments, blame forest node 318 comprises similar/identical hardware to classifier node 308 (e.g., a commodity server running a server-class operating system).

One way of constructing a blame forest is as follows. Blame forest node 318 receives a copy of model 302 from Hadoop cluster 306 and also receives a copy of training set 304. A blame forest 312 is created by what is depicted in FIG. 3 as blame forest writer 320 (and implemented, in various embodiments in a programming language such as Java). Using a first tree (T1) in model 302's forest of 500 decision trees as an example, the entire training set 304 (e.g., 1,000,000 training items) is run through the decision tree T1 by blame forest writer 320. For each leaf in T1, which training set examples were ultimately classified as that leaf are recorded. So, for example, training Item1, Item4952, and Item584924 (etc.) might all be classified as leaf1 of tree T1; training Item2, Item28482, and Item4958593 (etc.) might all be classified as leaf2 of tree T1; and so on (across all of the leaves in tree T1). For each tree in the forest (e.g., the other 499 trees), the process is repeated—with all 1,000,000 training items being classified using each of the respective trees.

The mapping between each training item, and at which respective leaves it arrived (across each of the trees in the forest) can be used to create a blame forest 312. The blame forest is similar in structure to a traditional random forest (e.g., used to create model 302), except that each of the leaf nodes in the blame forest is annotated (or otherwise associated) with the identifiers of those training items that reached that particular leaf node. One approach to annotation is as follows. Suppose each of the 1,000,000 examples in the training set is associated with an integer index (one-to-one and onto). An array of 1,000,000 integers is created which will store the leaf/training set mappings. Each leaf is associated with some positive number of training set examples, each leaf has a completely distinct set of training examples, and every training example is associated with exactly one leaf.

The first leaf (in an arbitrary leaf ordering) will have for example 23 training set examples associated with it. The index numbers associated with those 23 training set examples will be stored in the first 23 elements in the leaf/training set mapping array. The first leaf then only stores the first (0) and last (22) integers which point into the mapping array. The second leaf then might be associated with 10 training set examples, and the numbers for these examples are written into the mapping array and the leaf only has to store (23) and (32), which are the start and end points of its coverage in the mapping array. To resolve the second leaf's training examples, the 10 training example indices can be read from mapping array 23 to mapping array 32, allowing the storage of only two integers instead of an array of integers in each leaf, avoiding significant memory fragmentation.

Figure 4:
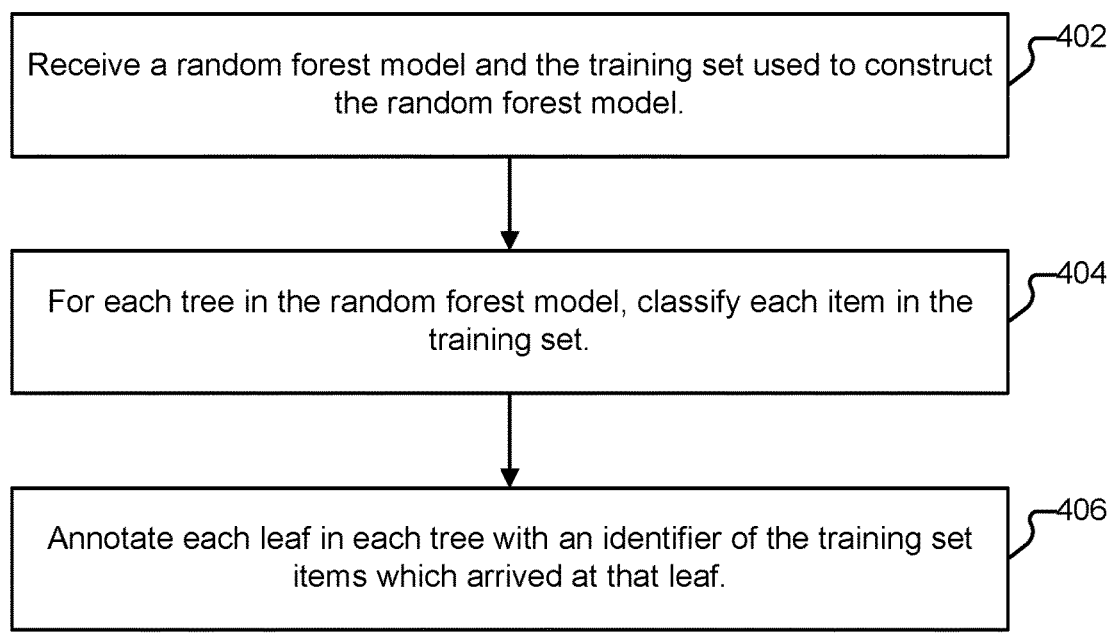
FIG. 4 illustrates an embodiment of a process for creating a blame forest.

FIG. 4 illustrates an embodiment of a process for creating a blame forest. In various embodiments, process 400 is performed by blame forest writer 320. The process begins at 402 when a training set (e.g., training set 304) and a random forest model constructed using the training set (e.g., model 302) are received (e.g., from Hadoop cluster 306). At 404, each item in the received training set is classified using the model (e.g., as described above). Finally (406), the random forest is augmented by annotating each leaf with the training set items which arrived at that leaf.

Usage

Figure 5:
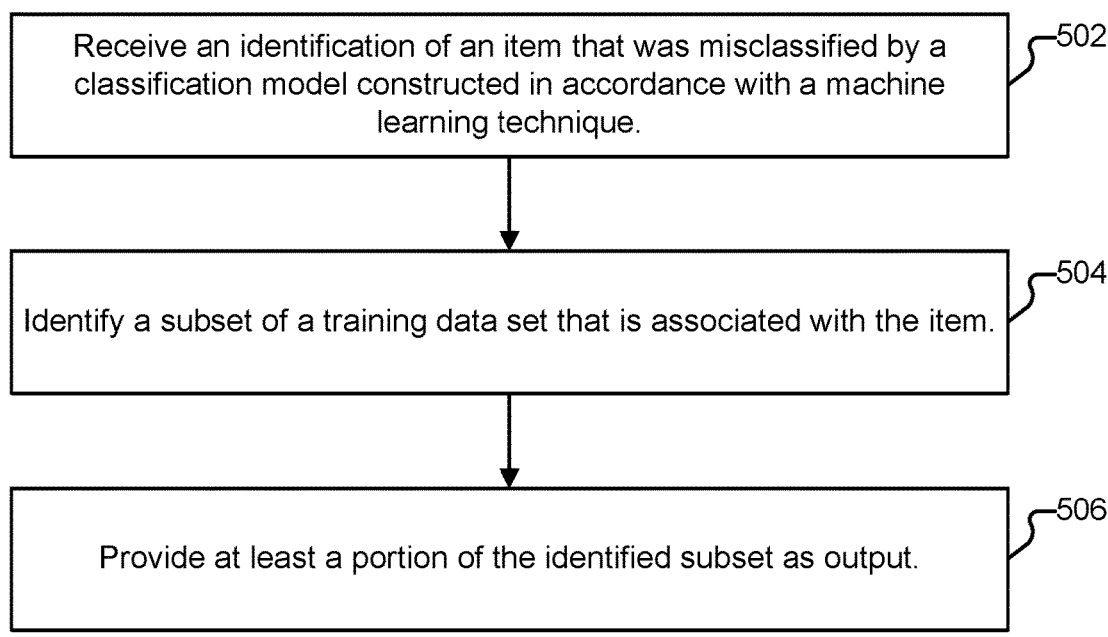
FIG. 5 illustrates an embodiment of a process for investigating a misclassified item.

FIG. 5 illustrates an embodiment of a process for investigating a misclassified item. In various embodiments, process 500 is performed by URL classification system 102. The process begins at 502 when an indication of an item that was misclassified is received. As one example, an indication can be received by system 102 at 502 when a user of client device 122 reports a misclassified URL (e.g., via software 126). As another example, an indication can be received at 502 when an administrator of data appliance 104 submits a trouble ticket to system 102 via a web interface made available by system 102 for reporting problems. In various embodiments, the input received at 502 is the misclassified URL itself (e.g., "http:/www.exampleproblem.com"). Additional information can also be received at 502 as applicable, such as a written description of why the item's classification is believed to be incorrect, contact information for the individual reporting the problem, etc.

At 504, members of the training set that are likely to have contributed to the (mis)classification of the misclassified item are identified. In particular, a prioritized list can be generated, across all of the trees in the blame forest, of the training samples that ended up being associated with the same leaf as the misclassified result. As used herein, a given leaf can be considered as a bucket—and when a new item is classified using model 302, each bucket into which the new item fell (across each of the trees) can be examined to determine which training examples fell into the same buckets. So for example, suppose the new URL (e.g., 310) was classified as leaf2 of tree T1. Also in the tree T1 leaf2 bucket are the training items 2, 28482, and 4958593. Suppose the new URL was labeled as leaf8473 of tree T2. Also in the tree T2 leaf8473 bucket are ten training items, and so on.

The resulting list of all training items sharing buckets with the misclassified URL can be sorted or otherwise analyzed to determine those training items most likely to have affected the final classification. As one example, a sum can be used, with those training items appearing the most frequently in a bucket alongside the misclassified URL considered more likely to have influenced the ultimate classification of the misclassified URL than other training items that less frequently share the same bucket (or not at all) with the misclassified URL. Those identified training items are provided as output at 506. The output can take a variety of forms, including a listing of the training set members' URLs, an identification of the training set item by an index/item number (e.g., item12345 instead of www.examplesite.com), and/or additional associated information, such as the categorization of the training set member ("sports"), its last visit date (e.g., content retrieved Jul. 15, 2014), the amount of text present in the item (e.g., 1,024 characters), etc. As applicable, a threshold can be applied to constrain the number of training items returned at 506 (e.g., to the top 5% of training items responsible, or the top 20 training items responsible, or only those training items appearing a threshold number of times at the same leaf as the misclassified URL, etc.).

The classifications of those training items appearing frequently in the buckets with the misclassified URL can be used to refine the list of likely problematic training items. As one example, suppose a URL should be classified as adult content (but was not), and the most prevalent training items sharing buckets with the URL are predominantly classified as either adult content or news. Since the training items related to adult content are consistent with expectations, prioritized focus can be given to the news-related training items sharing buckets with the misclassified URL.

One example use of a blame forest is as follows. Suppose a URL, www.joesonlinepharmacyandstuff.com (an online pharmacy site) is classified by classifier node 308 (using model 302) as being "philosophy," an erroneous classification. The misclassified URL can be run through blame forest 312 to generate a prioritized list of training items that fell into the same leaf buckets as the misclassified URL. Suppose the prioritized results of the blame forest are philosophy pages, followed by games, followed by weapons, followed by weather, followed by online pharmacy, and then various other categories. One reason this could occur is if pages included in the training sample (variously classified) no longer exist, but instead return 404 errors. I.e., some of the training items have become stale, but retain their content classifications. If the pharmacy page shares features with a 404 error page, it could be classified as similar to those pages coincidentally now returning 404 errors but having labels, such as philosophy. Once a problem has been identified (e.g., there are 404 errors in the training sample that should not be there), the problem can be addressed (e.g., by removing the training items leading to 404 errors).

The blame forest can also be used for other purposes. For example, multiple kinds of machine learning approaches (e.g., support vector machines and gradient boosted decision trees) can be used to classify URLs instead of/in addition to the random forest. The blame forest can be used to identify problems in the data set (e.g., a training set used across all approaches) so that the training sets used for other approaches' models can be refined.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      receive an identification of an item that was misclassified by a classification model constructed in accordance with a machine learning technique, and in response:
         identify a subset of a training data set used to construct the classification model, wherein the subset comprises at least one training sample, for which inclusion of the at least one training sample in the training data set during the construction of the classification model is determined to have likely contributed to a misclassification of the misclassified item, and wherein identifying the subset of the training data set includes creating a prioritized list of training samples sorted by a count of how often a given training sample shares a leaf with a misclassified item;
         update the training data set in response to the identification in the subset of the at least one training sample to form an updated training set; and
         generate an updated classification model using the updated training set;
      a memory coupled to the processor and configured to provide the processor with instructions.

2. The system of claim 1, wherein the item comprises a Uniform Resource Locator (URL) and where the URL was misclassified by the classification model as having content pertaining to a first category.

3. The system of claim 1, wherein the classification model is constructed using a random forest.

4. The system of claim 1, wherein an association between (1) the misclassified item and (2) the identified subset of the training data set is that the classification model classifies both (1) and (2) into a same classification.

5. The system of claim 1, wherein the misclassified item has an expected classification that is different from a classification initially given to the misclassified item and wherein creating the prioritized list includes removing those training samples which share the expected classification with the misclassified item.

6. The system of claim 1, wherein updating the training data set includes removing the at least one training sample.

7. The system of claim 6, wherein the training data set is used in conjunction with construction of a plurality of models using a plurality of respective different types of machine learning techniques and wherein, in response to updating the training data set, multiple models are rebuilt.

8. A method, comprising:
  receiving an identification of an item that was misclassified by a classification model constructed in accordance with a machine learning technique, and in response:
    identifying a subset of a training data set used to construct the classification model, wherein the subset comprises at least one training sample, for which inclusion of the at least one training sample in the training data set during the construction of the classification model is determined to have likely contributed to a misclassification of the misclassified item, and wherein identifying the subset of the training data set includes creating a prioritized list of training samples sorted by a count of how often a given training sample shares a leaf with a misclassified item;
    updating the training data set in response to the identification in the subset of the at least one training sample to form an updated training set; and
    generating an updated classification model using the updated training set.

9. The method of claim 8, wherein the item comprises a Uniform Resource Locator (URL) and where the URL was misclassified by the classification model as having content pertaining to a first category.

10. The method of claim 8, wherein the classification model is constructed using a random forest.

11. The method of claim 8, wherein an association between (1) the misclassified item and (2) the identified subset of the training data set is that the classification model classifies both (1) and (2) into a same classification.

12. The method of claim 8, wherein the misclassified item has a n expected classification that is different from a classification initially given to the misclassified item and wherein creating the prioritized list includes removing those training samples which share the expected classification with the misclassified item.

13. The method of claim 8, wherein updating the training data set includes removing the at least one training sample.

14. The method of claim 13, wherein the training data set is used in conjunction with construction of a plurality of models using a plurality of respective different types of machine learning techniques and wherein, in response to updating the training data set, multiple models are rebuilt.

15. A computer program product embodied in a non-transitory computer readable storage medium and comprising computer instructions for:
  receiving an identification of an item that was misclassified by a classification model constructed in accordance with a machine learning technique, and in response:
    identifying a subset of a training data set used to construct the classification model, wherein the subset comprises at least one training sample, for which inclusion of the at least one training sample in the training data set during the construction of the classification model is determined to have likely contributed to a misclassification of the misclassified item, and wherein identifying the subset of the training data set includes creating a prioritized list of training samples sorted by a count of how often a given training sample shares a leaf with a misclassified item;
    updating the training data set in response to the identification in the subset of the at least one training sample to form an updated training set; and
    generating an updated classification model using the updated training set.

16. The computer program product of claim 15, wherein the item comprises a Uniform Resource Locator (URL) and where the URL was misclassified by the classification model as having content pertaining to a first category.

17. The computer program product of claim 15, wherein the classification model is constructed using a random forest.

18. The computer program product of claim 15, wherein an association between (1) the misclassified item and (2) the identified subset of the training data set is that the classification model classifies both (1) and (2) into a same classification.

19. The computer program product of claim 15, wherein the misclassified item has an expected classification that is different from a classification initially given to the misclassified item and wherein creating the prioritized list includes removing those training samples which share the expected classification with the misclassified item.

20. The computer program product of claim 15, wherein updating the training data set includes removing the at least one training sample.

21. The computer program product of claim 20, wherein the training data set is used in conjunction with construction of a plurality of models using a plurality of respective different types of machine learning techniques and wherein, in response to updating the training data set, multiple models are rebuilt.

* * * * *

UNITED STATES PATENT AND TRADEMARK OFFICE
CERTIFICATE OF CORRECTION

| | | |
|---|---|---|
| PATENT NO. | : 11,455,551 B2 | |
| APPLICATION NO. | : 16/357064 | |
| DATED | : September 27, 2022 | |
| INVENTOR(S) | : William Redington Hewlett, II, Seokkyung Chung and Lin Xu | |

It is certified that error appears in the above-identified patent and that said Letters Patent is hereby corrected as shown below:

In the Claims

In Column 11, Line(s) 44, Claim 12, delete "a n", and insert --an--, therefor.

Signed and Sealed this
Thirteenth Day of June, 2023

Katherine Kelly Vidal
*Director of the United States Patent and Trademark Office*